United States Patent
Morita et al.

(10) Patent No.: US 10,431,383 B2
(45) Date of Patent: Oct. 1, 2019

(54) MULTILAYER CERAMIC CAPACITOR

(71) Applicant: TAIYO YUDEN CO., LTD., Taito-ku, Tokyo (JP)

(72) Inventors: Koichiro Morita, Takasaki (JP); Katsuya Taniguchi, Takasaki (JP); Minoru Ryu, Takasaki (JP); Yoshiki Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/456,991

(22) Filed: Mar. 13, 2017

(65) Prior Publication Data

US 2017/0365408 A1 Dec. 21, 2017

(30) Foreign Application Priority Data

Jun. 20, 2016 (JP) .................................. 2016-122005

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/1227* (2013.01); *H01G 4/232* (2013.01); *H01G 4/2325* (2013.01)

(58) Field of Classification Search
CPC ........ H01G 4/30; H01G 4/012; H01G 4/1227; H01G 4/2325
(Continued)

(56) References Cited

U.S. PATENT DOCUMENTS 4,086,649 A 4/1978 Hanold
5,910,881 A 6/1999 Ueno
(Continued)

FOREIGN PATENT DOCUMENTS

JP H04320017 A 11/1992
JP H104027 A 1/1998
(Continued)

OTHER PUBLICATIONS

A Non-Final Rejection issued by the U.S. Patent and Trademark Office, dated Sep. 7, 2017, for co-pending U.S. Appl. No. 15/456,962.
(Continued)

*Primary Examiner* — Michael P McFadden
(74) *Attorney, Agent, or Firm* — Law Office of Katsuhiro Arai

(57) ABSTRACT

A multilayer ceramic capacitor includes: a pair of external electrodes; a first internal electrode containing a base metal and coupled to one of the pair external electrodes; a dielectric layer stacked on the first internal electrode and containing a ceramic material and the base metal; and a second internal electrode stacked on the dielectric layer, containing the base metal, and coupled to another one of the external electrodes, wherein a concentration of the base metal in each of five regions, which are equally divided regions of a region between locations 50 nm away from the first and second internal electrodes in a stacking direction between the first and second internal electrodes, is within ±20% of an average of the concentrations of the base metal in the five regions, and thicknesses of the first internal electrode and the second internal electrode are 0.2 μm or greater.

8 Claims, 6 Drawing Sheets

(51) Int. Cl.
*H01G 4/12* (2006.01)
*H01G 4/232* (2006.01)

(58) Field of Classification Search
USPC .................................................... 361/301.4
See application file for complete search history.

(56) References Cited

U.S. PATENT DOCUMENTS

| | | | |
|---|---|---|---|
| 6,205,014 B1 | 3/2001 | Inomata et al. | |
| 6,205,015 B1 | 3/2001 | Wada et al. | |
| 6,380,118 B1 | 4/2002 | Harada et al. | |
| 6,930,876 B1 | 8/2005 | Noguchi et al. | |
| 7,354,642 B2 | 4/2008 | Shizuno et al. | |
| 2003/0062112 A1 | 4/2003 | Matsumoto | |
| 2004/0229746 A1* | 11/2004 | Park | C04B 35/4682 501/139 |
| 2005/0122639 A1 | 6/2005 | Okamatsu et al. | |
| 2006/0208575 A1 | 9/2006 | Orimo et al. | |
| 2007/0203015 A1 | 8/2007 | Tuan et al. | |
| 2007/0223177 A1 | 9/2007 | Ito et al. | |
| 2010/0110608 A1* | 5/2010 | Wei | C04B 35/4682 361/321.4 |
| 2010/0165541 A1 | 7/2010 | Sasabayashi et al. | |
| 2011/0216472 A1 | 9/2011 | Nakamura et al. | |
| 2012/0147524 A1 | 6/2012 | Okamoto et al. | |
| 2012/0162858 A1 | 6/2012 | Tanaka et al. | |
| 2013/0094121 A1 | 4/2013 | Endo et al. | |
| 2013/0286541 A1 | 10/2013 | Kawamoto | |
| 2014/0307362 A1 | 10/2014 | Kim et al. | |
| 2015/0062775 A1 | 3/2015 | Shibasaki et al. | |
| 2015/0136462 A1 | 5/2015 | Lee et al. | |
| 2015/0340156 A1 | 11/2015 | Masunari et al. | |
| 2016/0293333 A1 | 10/2016 | Kaneko et al. | |
| 2017/0365405 A1 | 12/2017 | Iwazaki et al. | |
| 2017/0365406 A1 | 12/2017 | Ryu et al. | |
| 2017/0365407 A1 | 12/2017 | Morita et al. | |
| 2017/0365409 A1 | 12/2017 | Morita et al. | |
| 2017/0365410 A1 | 12/2017 | Morita et al. | |
| 2017/0365411 A1 | 12/2017 | Taniguchi et al. | |
| 2017/0365412 A1 | 12/2017 | Taniguchi et al. | |

FOREIGN PATENT DOCUMENTS

| | | |
|---|---|---|
| JP | 2000331867 A | 11/2000 |
| JP | 2003173925 A | 6/2003 |
| JP | 2006319205 A | 11/2006 |
| JP | 2010232248 A | 10/2010 |
| JP | 2012129508 A | 7/2012 |
| JP | 5182531 B2 | 1/2013 |

OTHER PUBLICATIONS

Non-Final Office Action issued by U.S. Patent and Trademark Office, dated Feb. 6, 2019, for U.S. Appl. No. 15/457,337.
Non-Final Office Action issued by U.S. Patent and Trademark Office, dated Feb. 5, 2019, for U.S. Appl. No. 15/457,026.

* cited by examiner

FIG. 6

| | Ni CONCEN-TRATION IN DIELECTRIC LAYER | NUMBER OF UNIFORM LOCATIONS | MOST DEVIATED REGION | PERCENTAGE OF DEVIATION FROM AVERAGE | THICKNESS OF INTERNAL ELECTRODE ($\mu m$) | THICKNESS OF DIELECTRIC LAYER ($\mu m$) | THICKNESS OF INTERNAL ELECTRODE/ THICKNESS OF DIELECTRIC | NUMBER OF CAPACITANCE ANOMALIES (EXAMINED SAMPLES: 10000) | DETER-MINATION |
|---|---|---|---|---|---|---|---|---|---|
| EXAMPLE 1 | UNIFORM | 5 | END PORTION 1 | +18% | 0.20 | 0.40 | 0.50 | 0 | ○ |
| EXAMPLE 2 | UNIFORM | 4 | END PORTION 1 | +17% | 0.20 | 0.60 | 0.33 | 0 | ○ |
| EXAMPLE 3 | UNIFORM | 5 | END PORTION 1 | +9% | 0.30 | 0.40 | 0.75 | 0 | ○ |
| EXAMPLE 4 | UNIFORM | 5 | END PORTION 1 | +12% | 0.30 | 0.60 | 0.50 | 0 | ○ |
| EXAMPLE 5 | UNIFORM | 4 | END PORTION 1 | +10% | 0.30 | 0.80 | 0.38 | 0 | ○ |
| EXAMPLE 6 | UNIFORM | 5 | END PORTION 1 | +5% | 0.60 | 0.40 | 1.50 | 0 | ○ |
| EXAMPLE 7 | UNIFORM | 5 | END PORTION 1 | +6% | 0.60 | 0.60 | 1.00 | 0 | ○ |
| EXAMPLE 8 | UNIFORM | 5 | END PORTION 1 | +9% | 0.60 | 0.80 | 0.75 | 0 | ○ |
| EXAMPLE 9 | UNIFORM | 5 | END PORTION 1 | +2% | 0.80 | 0.40 | 2.00 | 0 | ○ |
| EXAMPLE 10 | UNIFORM | 5 | END PORTION 1 | +3% | 0.80 | 0.60 | 1.33 | 0 | ○ |
| EXAMPLE 11 | UNIFORM | 5 | END PORTION 1 | +7% | 0.80 | 0.80 | 1.00 | 0 | ○ |
| EXAMPLE 12 | UNIFORM | 5 | END PORTION 1 | +10% | 0.80 | 1.00 | 0.80 | 0 | ○ |
| COMPARATIVE EXAMPLE 1 | NON-UNIFORM | 0 | END PORTION 1 | +25% | 0.15 | 0.40 | 0.38 | 39 | × |
| COMPARATIVE EXAMPLE 2 | NON-UNIFORM | 0 | CENTRAL PORTION 3 | -38% | 0.15 | 0.60 | 0.25 | 54 | × |

MULTILAYER CERAMIC CAPACITOR

CROSS-REFERENCE TO RELATED APPLICATION

This application is based upon and claims the benefit of priority of the prior Japanese Patent Application No. 2016-122005, filed on Jun. 20, 2016, the entire contents of which are incorporated herein by reference.

FIELD

A certain aspect of the present invention relates to a multilayer ceramic capacitor.

BACKGROUND

To achieve small-sized large-capacity multilayer ceramic capacitors, dielectric layers have been thinned and the number of stacked dielectric layers has been increased. The design of dielectric layers that determine the characteristics of the multilayer ceramic capacitor is important. For example, disclosed is a technique that diffuses Ni into 3 to 30% of the distance between internal electrodes to improve the temperature characteristic of the capacitance (see Japanese Patent Application Publication No. 10-4027, hereinafter referred to as Patent Document 1, for example).

Japanese Patent Application Publication No. 2012-129508 (hereinafter, referred to as Patent Document 2) discloses a technique that improves the relative permittivity and the temperature characteristic of the electrostatic capacitance of a multilayer ceramic electronic component by managing the abundance of Mg and the abundance of Si in a grain boundary of a dielectric ceramic composition constituting the dielectric layer. In addition, it is disclosed to improve the lifetime in high temperature by controlling the abundance of Ni in a grain boundary.

However, in the technique of Patent Document 1, a base metal is not diffused in the middle portion of the dielectric layer in the stacking direction, and therefore, the concentration of the base metal may be partially high in the stacking direction. The part with a high concentration of the base metal decreases the permittivity of the dielectric layer. The technique of Patent Document 2 does not disclose the concentration distribution of a base metal in the stacking direction in a dielectric layer between electrodes. In addition, it is not disclosed which range the thickness of the internal electrode is to be to diffuse the base metal.

SUMMARY OF THE INVENTION

According to an aspect of the present invention, there is provided a multilayer ceramic capacitor including: a pair of external electrodes; a first internal electrode that contains a base metal and is coupled to one of the pair of external electrodes; a dielectric layer that is stacked on the first internal electrode and contains a ceramic material and the base metal; and a second internal electrode that is stacked on the dielectric layer, contains the base metal, and is coupled to another one of the pair of external electrodes, wherein a concentration of the base metal in each of five regions is within ±20% of an average of the concentrations of the base metal in the five regions, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode, and a thickness of the first internal electrode and a thickness of the second internal electrode are 0.2 μm or greater.

BRIEF DESCRIPTION OF THE DRAWINGS

FIG. 6 illustrates examples and comparative examples.

DETAILED DESCRIPTION

A description will be given of an embodiment with reference to the accompanying drawings.

Embodiment

Figure 1:
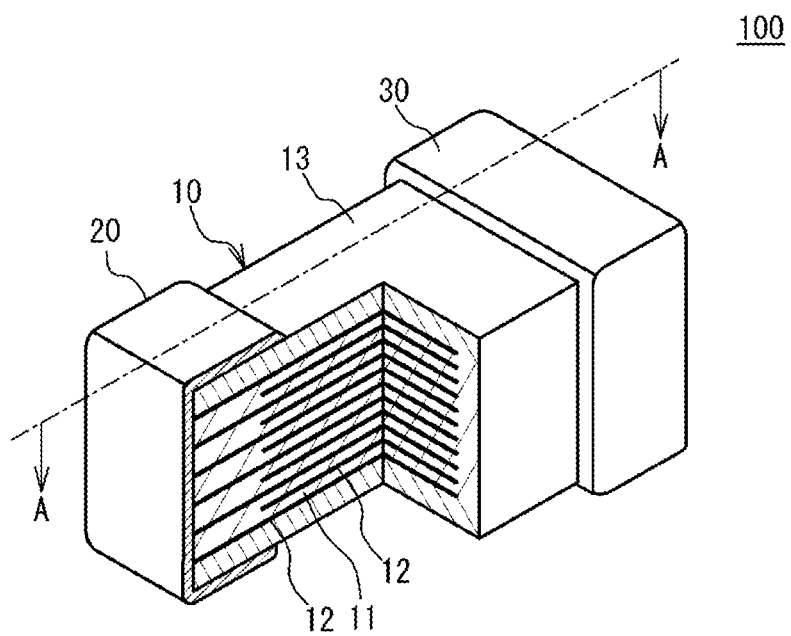
FIG. 1 is a partial cross-sectional perspective view of a multilayer ceramic capacitor.

A multilayer ceramic capacitor will be described. FIG. 1 is a partial cross-sectional perspective view of a multilayer ceramic capacitor 100. As illustrated in FIG. 1, the multilayer ceramic capacitor 100 includes a multilayer chip 10 having a rectangular parallelepiped shape, and external electrodes 20 and 30 that are located on opposing end faces of the multilayer chip 10.

The external electrodes 20 and 30 contain a base metal material. The multilayer chip 10 has a structure designed to have dielectric layers 11, which contain a ceramic material functioning as a dielectric, and internal electrode layers 12, which contain a base metal material, alternately stacked. The end edges of the internal electrode layers 12 are alternately exposed to the end face, on which the external electrode 20 is located, of the multilayer chip 10, and to the end face, on which the external electrode 30 is located, of the multilayer chip 10. Accordingly, the internal electrode layers 12 are alternately electrically coupled to the external electrode 20 and to the external electrode 30. This structure allows the multilayer ceramic capacitor 100 to have a structure in which a plurality of the dielectric layers 11 are stacked across the internal electrode layers 12. Additionally, in the multilayer chip 10, both end faces in the direction in which the dielectric layers 11 and the internal electrode layers 12 are stacked (hereinafter, referred to as the stacking direction) are covered with cover layers 13. The material of the cover layer 13 is, for example, the same as the material of the dielectric layer 11.

The multilayer ceramic capacitor 100 has, for example, a length of 0.2 mm, a width of 0.1 mm, and a height of 0.3 mm, or a length of 0.6 mm, a width of 0.3 mm, and a height of 0.3 mm, or a length of 1.0 mm, a width of 0.5 mm, and a height of 0.5 mm, or a length of 3.2 mm, a width of 1.6 mm, and a height of 1.6 mm, or a length of 4.5 mm, a width of 3.2 mm, and a height of 2.5 mm, but the dimensions are not limited to the above dimensions.

The external electrodes 20 and 30 and the internal electrode layer 12 are mainly composed of a base metal such as nickel (Ni), copper (Cu), or tin (Sn). The dielectric layer 11 is mainly composed of a ceramic material having a perovskite structure expressed by a general expression $ABO_3$. The perovskite structure includes $ABO_{3-\alpha}$ having an offstoichiometric composition. The base metal contained in the internal electrode layer 12 is diffused into the dielectric layer 11 in the form of an oxidized material. Accordingly, the base metal is distributed in the dielectric layer 11. When the concentration of the base metal is partially high in the stacking direction in the dielectric layer 11, the permittivity decreases. Thus, in the following embodiment, a description will be given of a multilayer ceramic capacitor that can inhibit the decrease in permittivity. As an example, the embodiment will focus on Ni as the base metal contained in the internal electrode layer 12, and on $BaTiO_3$ (barium titanate) as the ceramic material with a perovskite structure contained in the dielectric layer 11.

Figure 2:
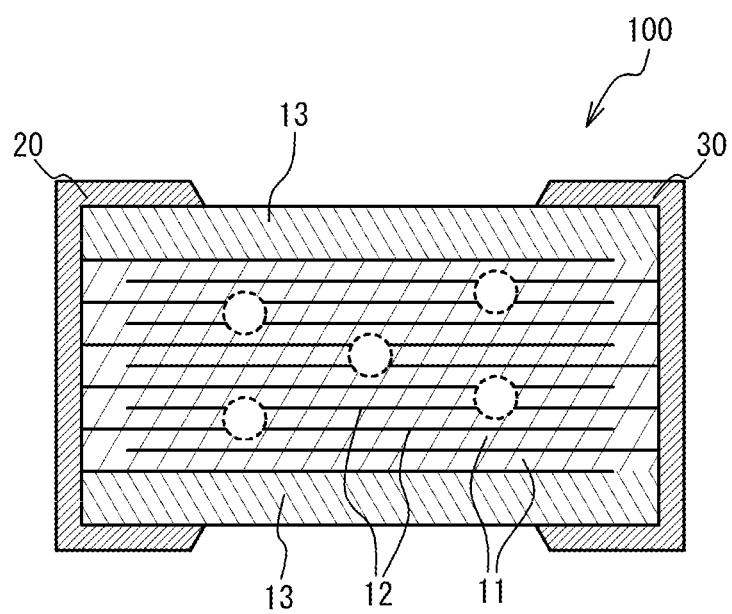
FIG. 2 is a cross-sectional view taken along line A-A in FIG. 1.

FIG. 2 is a cross-sectional view taken along line A-A in FIG. 1. The dielectric layer 11 sandwiched between two internal electrode layers 12, one of which is coupled to the external electrode 20 and the other of which is coupled to the external electrode 30, has a uniform Ni concentration in the stacking direction. Thus, the existence of a region partially having a high Ni concentration is inhibited in the dielectric layer 11. As a result, the decrease in permittivity of the dielectric layer 11 can be inhibited. In addition, the inhibition of the decrease in permittivity of the dielectric layer 11 stabilizes the capacitance of the multilayer ceramic capacitor 100 in which a plurality of the dielectric layers 11 are stacked. As a result, variability in capacitance among a plurality of the multilayer ceramic capacitors 100 can be reduced. As a result, reduced is a capacitance anomaly that the capacitance does not fall even within the lower 20% range of the normal distribution of the average capacitances of products and deviates from the normal distribution. As a result, the capacitance anomaly that the capacitance unexpectedly falls below the lower limit of the allowable limits of the capacitance can be reduced.

Figure 3:
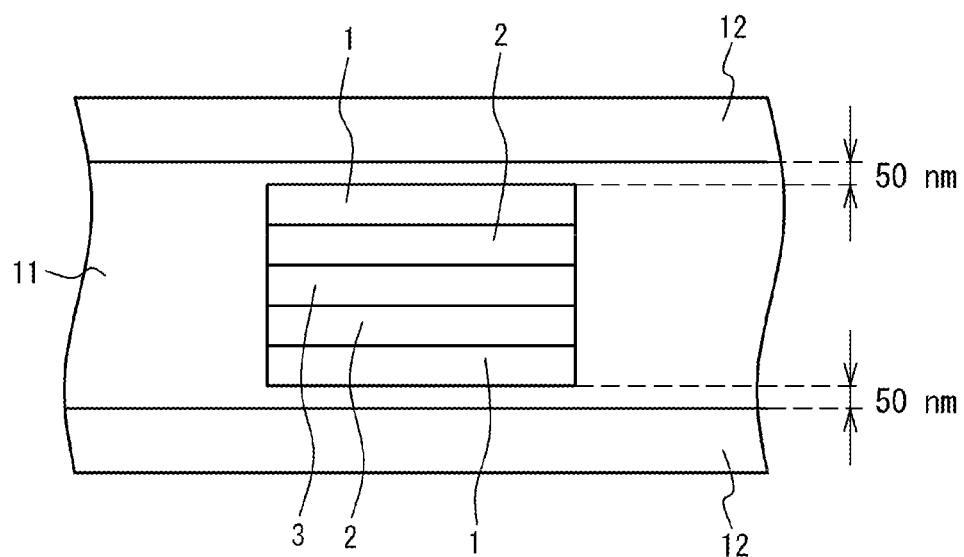
FIG. 3 is a partial enlarged view of FIG. 2.

Next, the term "uniform Ni concentration" will be described. FIG. 3 is a partial enlarged view of the cross-section of the multilayer ceramic capacitor 100, schematically enlarging any of areas indicated by circles in FIG. 2. Hatching is omitted. As illustrated in FIG. 3, in the stacking direction between opposing surfaces of two adjacent internal electrode layers 12, a region from a location 50 nm away from one of the internal electrode layers 12 to a location 50 nm away from the other of the internal electrode layers 12 is virtually divided into five equal regions. Two measurement regions closest to the internal electrode layers 12 are referred to as end portions 1, the central measurement region is referred to as a central portion 3, and measurement regions between the end portions 1 and the central portion 3 are referred to as end portions 2. The Ni concentration of the dielectric layer 11 in the stacking direction between two adjacent internal electrode layers 12 is defined to be uniform when the Ni concentration in each of five measurement regions obtained by division into five equal regions is within ±20% of the average of the Ni concentrations in the five measurement regions. The reason for using the region located 50 nm away from the internal electrode layers 12 is because the reflection by Ni of the internal electrode layer 12 may prevent the accurate measurement. In addition, the width of the measurement region is made to be 1 to 1.5 times the thickness of the dielectric layer 11 in the stacking direction. The both end faces in the stacking direction of the dielectric layer 11 in each measurement region are located in a region where the two adjacent internal electrode layers 12 overlap with each other in plan view over the entire region. The two adjacent internal electrode layers here mean the electrodes producing a capacitance. That is, the two adjacent internal electrode layers are internal electrode layers one of which is coupled to the external electrode 20 and the other of which is coupled to the external electrode 30.

A description will next be given of a measurement method of the Ni concentration. The Ni concentration can be calculated by measuring the distribution of Ni atoms in the stacking direction in the dielectric layer 11. The distribution of Ni atoms can be measured with a transmission electron microscope or the like. For example, a TEM-EDS (TEM JEM-2100F manufactured by JEOL Ltd.), an EDS detector (JED-2300T manufactured by JEOL Ltd.) or the like can be used. Samples for the measurement can be made by mechanically polishing (polishing in a plane normal to the internal electrode layer) a reoxidized multilayer ceramic capacitor, and thinning the resulting multilayer ceramic capacitor by ion milling. For example, five samples with a thickness of 0.05 μm for five measurement regions may be made. If a sample that allows five measurement regions to be measured with the sample alone is made, the measurement that can reduce variations can be performed.

For example, a transmission electron microscope with a probe diameter of 1.5 nm scans and measures each measurement region over the entire range to measure the Ni concentration in each measurement region. To avoid the effect of variations in thickness of the sample, an atomic concentration ratio Ni/(Ba+Ti) is used as the Ni concentration. That is, the Ni concentration, i.e., the abundance ratio of Ni to (Ba+Ti), can be measured by measuring the abundance of Ni atoms, Ba atoms, and Ti atoms by a transmission electron microscope or the like. The tip portion of the internal electrode layer 12 and an anomalous point at which deposits aggregate in the dielectric layer 11 are excluded from the Ni concentration measurement. For example, an area containing a composition different from that of the parent phase and having a diameter of 50 nm or greater is excluded from the measurement regions. Such a location is, for example, a location in which compounds containing Si, compounds containing Mn, or compounds containing Ni—Mg aggregate to exist. Alternatively, such a location is a location where the abundance ratio of Ba and Ti is 90% or less.

For example, the count numbers of (Ni_Kα), (Ba_Lα), and (Ti_Kα) are obtained from an STEM-EDS spectrum, and are normalized by dividing them by respective sensitivity factors (respective k factors) used in the Cliff-Lorimer method. When the count number of (Ni_Kα)=I(Ni), the count number of (Ba_Lα)=I(Ba), and the count number of (Ti_Kα)=I(Ti), the Ni concentration={I(Ni)/k(Ni)}/{I(Ba)/k(Ba)+I(Ti)/k(Ti)}. Where k(Ni), k(Ba), and k(Ti) are sensitivity factors for normalization.

Then, based on the normalized values, the Ni concentration is calculated by the normalized value of (Ni_Kα)/{the normalized value of (Ba_Lα)+the normalized value of (Ti_Kα)}. In each region, the measurement is performed till the intensity of (Ba_Lα)+(Ti_Kα) exceeds 500,000 counts. The JED Series Analysis Program manufactured by JEOL Ltd. can be used to calculate the Ni concentration from the STEM-EDS spectrum.

Since Ni diffuses from the internal electrode layer 12 into the dielectric layer 11, it is necessary that the internal electrode layer 12 is in contact with the dielectric layer 11 and Ni is present in sufficient abundance for the concentration gradient of Ni to be maintained. Thus in the embodiment, the internal electrode layer 12 is made to have a thickness of 0.2 μm or greater. When the internal electrode layer 12 has a thickness of 0.2 μm or greater, Ni smoothly diffuses from the internal electrode layer 12 into the dielectric layer 11, and Ni contained in the internal electrode layer 12 can be sufficiently diffused into the dielectric layer 11. Thereby, the Ni concentration in the stacking direction of the dielectric layer 11 can be stably uniformized. To diffuse Ni, the internal electrode layer 12 preferably has a thickness of 0.3 µm or greater, more preferably 0.6 µm or greater.

To sufficiently promote the diffusion of Ni, the thickness of the dielectric layer 11 is preferably small. Thus, the ratio of the thickness of the internal electrode layer 12 to the thickness of the dielectric layer 11 (the thickness of the internal electrode/the thickness of the dielectric) is preferably 0.5 or greater. Ni can be diffused into the dielectric layer 11 evenly by making the ratio be 0.5 or greater. The ratio is more preferably 0.75 or greater, further preferably 1.0 or greater.

The thicknesses of the dielectric layer 11 and the internal electrode layer 12 can be measured as follows, for example. First, the central portion of the multilayer ceramic capacitor 100 is cut by ion milling so that the cross-section illustrated in FIG. 2 is exposed. Then, the exposed cross-section is photographed by a scanning electron microscope (SEM), and the thicknesses of the dielectric layer 11 and the internal electrode layer 12, i.e., the dimensions in the stacking direction, are then measured based on the resulting photo. An SEM photo is taken so that the view angle of the SEM photo is 10 to 30 µm in both length and width, and the thicknesses of the dielectric layer 11 and the internal electrode layer 12 are measured at several locations located every 3 µm, and the averages of the measured values are specified to be the thicknesses of the dielectric layer 11 and the internal electrode layer 12. Twenty locations are measured in each of five different fields of view to obtain 100 sets of data, and the average of the measured values is specified to be the layer thickness.

It is preferable that 80% or more of a plurality of the dielectric layers 11 stacked in the multilayer ceramic capacitor 100 have a uniform Ni concentration in the stacking direction, and the two internal electrode layers 12 adjacent to the dielectric layer 11 have thicknesses of 0.2 µm or greater. This is because the Ni concentration of the dielectric layer is uniformized in whole in the stacking direction of the multilayer ceramic capacitor 100, and the capacitance of the multilayer ceramic capacitor 100 thereby stabilizes. In this case, variability in capacitance among a plurality of the multilayer ceramic capacitors 100 can be reduced.

In the present embodiment, when 80% or more of a plurality of the dielectric layers 11 stacked in the multilayer ceramic capacitor 100 have a uniform Ni concentration in the stacking direction, the Ni concentration of the overall dielectric layer in the stacking direction of the multilayer ceramic capacitor 100 is defined to be uniform. For example, as indicated by circles in FIG. 2, when the Ni concentrations of at least four dielectric layers 11 out of five dielectric layers 11 located in different locations in the stacking direction are uniform, it can be judged that 80% or more of the dielectric layers 11 have a uniform Ni concentration. In the multilayer ceramic capacitor 100, when the Ni concentrations of the dielectric layers 11 located in different locations in the stacking direction are uniform, the capacitance of the multilayer ceramic capacitor 100 stabilizes. Accordingly, variability in capacitance among a plurality of the multilayer ceramic capacitors 100 can be reduced. Therefore, reduced is a capacitance anomaly that the capacitance does not fall even within the lower 20% range of the normal distribution of the average capacitances of products and deviates from the normal distribution.

It is preferable that when 90% or more of a plurality of the dielectric layers 11 stacked in the multilayer ceramic capacitor 100 have a uniform Ni concentration in the stacking direction, the Ni concentration of the overall dielectric layer in the stacking direction of the multilayer ceramic capacitor 100 is defined to be uniform. For example, as indicated by circles in FIG. 2, when all the Ni concentrations of five dielectric layers 11 located in different locations in the stacking direction are uniform, it can be judged that 90% or more of the dielectric layers 11 have a uniform Ni concentration.

Figure 4:
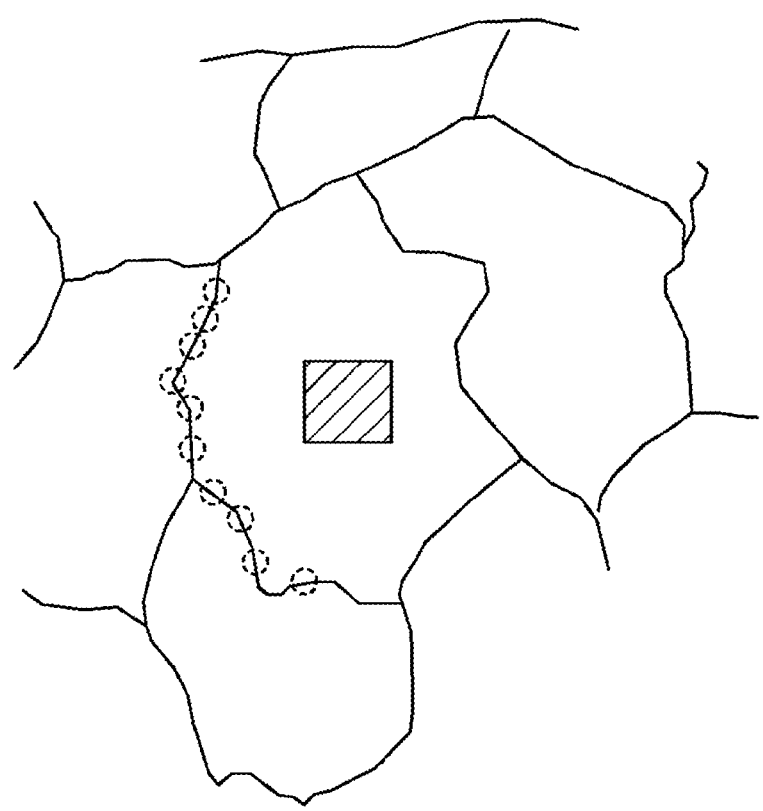
FIG. 4 illustrates crystal grains and a crystal grain boundary.

When a crystal grain boundary exists in the above five measurement regions, the Ni concentration in a crystal grain and the Ni concentration of the crystal grain boundary adjacent to the crystal grain are preferably equal to each other. In this case, variations in Ni concentration, which tends to be segregated in the crystal grain boundary, are reduced, and the Ni concentration in the stacking direction of the dielectric layer 11 can be made to be further uniform. For example, as illustrated in FIG. 4, in a crystal grain, the Ni concentration can be measured by scanning a target region in a 50-nm square area (a hatched part in FIG. 4) by a transmission electron microscope or the like using the above-described measurement method. In a crystal grain boundary, using the above-described method, for example, ten points (points indicated by circles in FIG. 4) on the crystal grain boundary adjacent to the crystal grain are measured with a 1.5 nm probe, and the average of the obtained Ni concentrations can be measured as the Ni concentration of the crystal grain boundary. When the Ni concentration in the crystal grain is within ±20% of the Ni concentration of the crystal grain boundary, both the Ni concentrations are defined to be equal to each other.

As illustrated in FIG. 2, when the Ni concentration in a crystal grain and the Ni concentration of the crystal grain boundary adjacent to the crystal grain are equal in 80% or more of a plurality of the dielectric layers 11 stacked in the multilayer ceramic capacitor 100, the Ni concentration in a crystal grain and the Ni concentration of the crystal grain boundary adjacent to the crystal grain are defined to be equal across the multilayer ceramic capacitor 100. For example, as illustrated in FIG. 2, when the Ni concentration in a crystal grain and the Ni concentration of the crystal grain boundary adjacent to the crystal grain are equal in at least four out of five dielectric layers 11 located in different locations in the stacking direction, it can be judged that the Ni concentration in a crystal grain and the Ni concentration of the crystal grain boundary adjacent to the crystal grain are equal in 80% or more of a plurality of the dielectric layers 11. When the Ni concentration in a crystal grain and the Ni concentration of the crystal grain boundary adjacent to the crystal grain are equal across the multilayer ceramic capacitor 100, the capacitance of the multilayer ceramic capacitor 100 further stabilizes. Accordingly, variability in capacitance among a plurality of the multilayer ceramic capacitors 100 can be further reduced. Therefore, reduced is a capacitance anomaly that the capacitance does not fall even within the lower 20% range of the normal distribution of the average capacitances of products and deviates from the normal distribution. Abnormal locations (for example, locations at which many segregations are aggregated), which seem evidently not to typify the product or the lot subjected to the measurement, are excluded from the measurement locations, and the segregation locations in which a secondary phase exists are excluded from the measurement. For example, an area having a composition different from that of the parent phase and having a diameter of 50 nm or greater is not employed as a measurement region. Examples of such locations are locations in which compounds containing Si, compounds containing Mn, or compounds containing Ni—Mg are aggregated to exist. Another example of such locations is a location where the abundance ratio of Ba and Ti is 90% or less.

The dielectric layer 11 has been described as having a uniform Ni concentration in the stacking direction, but the Ni concentration in the dielectric layer 11 is approximately, for example, from 0.015 to 0.045.

To further inhibit the occurrence of the capacitance anomaly, it is preferable that the Ni concentration of the dielectric layer 11 in the stacking direction between two adjacent internal electrode layers 12 is defined to be uniform when the Ni concentration in each of the above five measurement regions is preferably within ±10%, more preferably within ±5% of the average of the Ni concentrations in the five measurement regions. In addition, the above description has focused attention on $BaTiO_3$ as a dielectric and on Ni as a base metal, but does not intend to suggest any limitation. Since the permittivity decreases if other dielectrics also have a region in which the concentration of the base metal is partially high, the above-described embodiment can be applied to other dielectrics and other base metals.

Figure 5:
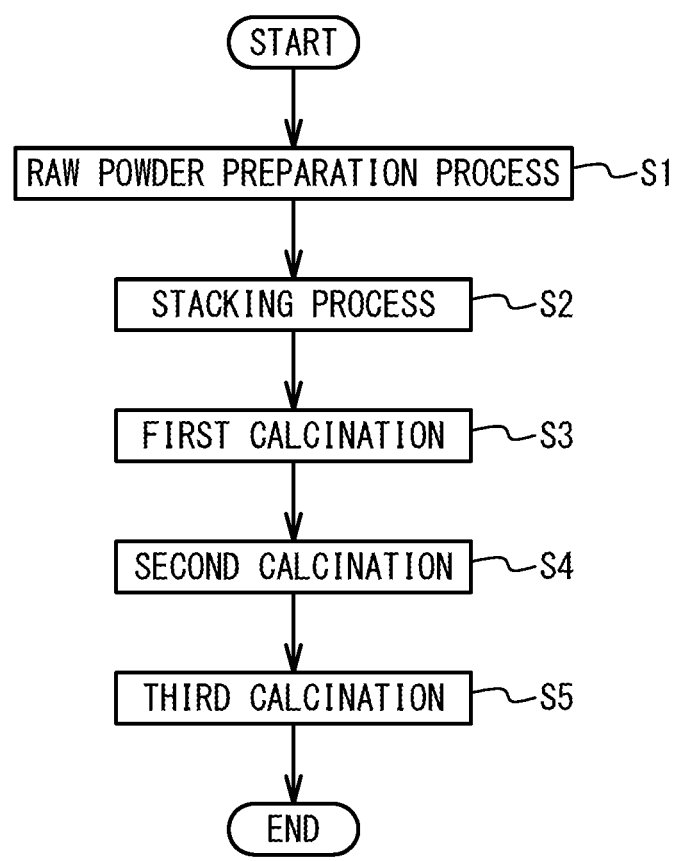
FIG. 5 is a flowchart illustrating a method of manufacturing the multilayer ceramic capacitor.

A description will next be given of a manufacturing method of the multilayer ceramic capacitor 100. FIG. 5 is a flowchart illustrating a method of manufacturing the multilayer ceramic capacitor 100.

Raw Powder Preparation Process

First, as illustrated in FIG. 5, raw powder for forming the dielectric layer 11 is prepared. Ba and Ti contained in the dielectric layer 11 are normally contained in the dielectric layer 11 in the form of a sintered compact of particles of $BaTiO_3$. $BaTiO_3$ is a tetragonal compound having a perovskite structure, exhibiting a high permittivity. $BaTiO_3$ is normally obtained by reacting a titanium raw material such as titanium dioxide with a barium raw material such as barium carbonate to synthesize barium titanate. There have been known many kinds of methods such as, for example, the solid phase method, the sol-gel method, and the hydrothermal method as a method of synthesizing $BaTiO_3$. The present embodiment can employ any of these methods.

Specified additive compounds may be added to the resulting ceramic powder according to the purpose. The examples of the additive compounds include Mg, Mn, V, Cr, oxidation materials of rare-earth elements (Y, Dy, Tm, Ho, Tb, Yb, and Er), and oxidation materials of Sm, Eu, Gd, Co, Li, B, Na, K, and Si, or glass.

In the present embodiment, preferably, a compound containing an additive compound is mixed with particles of $BaTiO_3$, and the resulting mixture is calcined at 820 to 1150° C. Then, the resulting particles of $BaTiO_3$ are wet blended with the additive compound, dried, and ground to prepare ceramic powder. For example, the particles of $BaTiO_3$ obtained by the above described method and used to manufacture the multilayer ceramic capacitor 100 of the present embodiment preferably have an average particle size of 50 to 150 nm to make the dielectric layer 11 thinner. For example, the particle size of the ceramic powder obtained as described above may be adjusted by a grinding treatment as necessary, or may be controlled in combination with a classification treatment.

Stacking Process

Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a conductive metal paste containing an organic binder is printed on the surface of the dielectric green sheet by screen printing or gravure printing to arrange a pattern of internal electrode layers alternately led out to a pair of external electrodes of different polarizations. For the metal of the conductive metal paste, used is Ni with a purity of 99% or greater. $BaTiO_3$ with an average particle size of 50 nm or less may be homogeneously distributed as a co-material into the conductive metal paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers are alternately exposed to both end faces in the length direction of the dielectric layer so as to be alternately led out to a pair of external electrodes of different polarizations.

Cover sheets, which are to be the cover layers 13, are pressed to be bonded at the top and bottom of the stacked dielectric green sheets, and cut into a predetermined chip size (for example, 1.0×0.5 mm). This process allows the molded body of the multilayer chip 10 to be obtained.

First Calcination Process

The molded body of the multilayer chip 10 obtained as described above is debindered in an $N_2$ atmosphere, at 250 to 500° C., and is then calcined in a reducing atmosphere (with an oxygen partial pressure of $10^{-5}$ to $10^{-7}$ Pa), at 1100 to 1300° C. for ten minutes to two hours. This process causes the compounds constituting the dielectric green sheets to be sintered, growing grains of the compounds. In this manner, obtained is the multilayer ceramic capacitor 100 including the multilayer chip 10 formed of the dielectric layers 11 and the internal electrode layer 12 that are made of a sintered compact and alternately stacked thereinside, and the cover layers 13 formed as the outermost layers at the top and the bottom in the stacking direction.

Second Calcination Process

Then, second calcination is performed as a heat treatment for diffusing Ni in the internal electrode layer 12 into the dielectric layer 11. The multilayer ceramic capacitor 100 is heat treated at 1000 to 1200° C., which is lower than the temperature of the first calcination by 50 to 100° C., at an oxygen partial pressure of $10^{-3}$ to $10^{-6}$ Pa for about two to four hours. The calcination at an oxygen partial pressure higher than that of the first calcination facilitates oxidation of Ni, and sufficiently diffuses Ni into the dielectric layer 11. On the other hand, since the temperature is lower than that of the first calcination, grain growth in the dielectric layer 11 is inhibited. Accordingly, the dielectric layer 11 is to have a uniform Ni concentration in the stacking direction.

Third Calcination Process

Then, as reoxidation calcination, performed is third calcination (a reoxidation treatment) at 600 to 1000° C., at an oxygen partial pressure of $10^{-2}$ to 10 Pa for about one hour. In the third calcination process, since the oxygen partial pressure is high, Ni is oxidized, but the Ni concentration in the dielectric layer 11 does not change because the calcination temperature range is lower than that of the second calcination process.

When the temperature and time for calcination are insufficient, the diffusion of Ni may become inhomogeneous. Thus, the temperature and time of the calcination reaction are preferably appropriately adjusted depending on the component size and the number of stacked layers. The thickness of the conductive metal paste is adjusted in the stacking process so that the thickness of the internal electrode layer 12 that has undergone the first through third calcination processes becomes 0.2 μm or greater. The thickness of the dielectric layer 11 becomes preferably 0.3 μm or greater, more preferably 0.6 μm or greater. In addition, it is preferable that the thickness of the dielectric green sheet is adjusted in the stacking process so that the ratio of the thickness of the internal electrode layer 12 to the thickness of the dielectric layer 11 (the thickness of the internal electrode/the thickness of the dielectric) becomes 0.5 or greater. The ratio becomes preferably 0.75 or greater, more preferably 1.0 or greater. The external electrodes 20 and 30 may be formed by, for example, calcining the multilayer chip 10 formed by stacking the dielectric layers 11 and the internal electrode layers 12, and then baking a conductive paste on both end portions of the multilayer chip 10. Alternatively, a conductive paste may be applied before the second calcination, and baked simultaneously at the time of the second calcination. The external electrodes may be thickly formed on both end faces of the multilayered body by sputtering.

In addition to the above-described manufacturing method, Ni can be homogeneously formed in the dielectric layer 11 by adding NiO to slurry when the slurry is formed. Alternatively, a method that diffuses Ni into the dielectric layer from the internal electrode by adding NiO to slurry and then performing the above-described second calcination process may be employed.

EXAMPLES

The multilayer ceramic capacitors in accordance with the embodiment were made to examine the characteristics.

Examples 1 to 12

The multilayer ceramic capacitors 100 were made in accordance with the manufacturing method in accordance with the above-described embodiment. Table 1 lists the structure common to examples 1 to 12. The external electrodes 20 and 30 are formed on both end portions of the multilayer chip 10, and have a structure including a Cu portion (with a thickness of 22 μm), a Ni portion (with a thickness of 2 μm) formed on the Cu portion by plating, and an Sn portion (with a thickness of 6 μm) formed on the Ni portion by plating. The central portion of the multilayer ceramic capacitor 100 was cut by ion milling so that the cross-section illustrated in FIG. 2 was exposed, and the exposed cross-section was photographed by a scanning electron microscope (SEM). Then the thicknesses of the dielectric layer 11 and the internal electrode layer 12, i.e., the dimensions in the stacking direction, were measured based on the resulting photo. An SEM photo was taken so that the view angle of the SEM photo was 10 to 30 μm in both length and width, and the thicknesses of the dielectric layer 11 and the internal electrode layer 12 were measured at several locations located every 3 μm. Then, the averages of the measured thicknesses were calculated as the thicknesses of the dielectric layer 11 and the internal electrode layer 12. Twenty locations were measured in five different fields of view to obtain 100 sets of data, and the averages of them were specified to be the thicknesses of the dielectric layer 11 and the internal electrode layer 12.

TABLE 1

| Dimensions (mm) | |
| --- | --- |
| Length × Width × Height | 1.0 × 0.5 × 0.5 |
| Number of dielectric layers | 200 |
| Thickness of the external electrode (including plating) | 30 μm |
| Relative permittivity | 2000 to 4800 |

In the examples 1 to 12, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheets to be sintered to grow grains of the compounds. Then, in the second calcination process, the multilayer ceramic capacitor 100 was calcined in a reducing atmosphere with an oxygen partial pressure of $5.0 \times 10^{-6}$ Pa, at 1100° C., which is 100° C. lower than the temperature of the first calcination process, for three hours to diffuse Ni in the internal electrode into the dielectric layer. Then, the third calcination process was performed. The purity of Ni in the internal electrode after the calcination was 95%.

In comparative examples 1 and 2, in the first calcination process, the molded body of the multilayer chip 10 was debindered in an $N_2$ atmosphere, at 250 to 500° C., and then calcined in a reducing atmosphere with an oxygen partial pressure of $5.0 \times 10^{-6}$ Pa, at 1200° C. for one hour to cause the compounds constituting the dielectric green sheet to be sintered to grow grains of the compounds. Then, the second calcination process was skipped and the third calcination process was performed.

Ten thousand samples were made for each of the examples 1 to 12 and the comparative examples 1 and 2.

For the examples 1 to 12 and the comparative examples 1 and 2, the Ni concentration of the dielectric layer 11 was measured. As described above, in the stacking direction, a region from a location 50 nm away from one internal electrode layer 12 and to a location 50 nm away from the other internal electrode layer 12 was virtually divided into five equal regions. The width in the direction perpendicular to the stacking direction was made to be 1.2 times the thickness of the dielectric layer, and the Ni concentrations in the obtained five measurement regions were measured. The two adjacent internal electrode layers 12 overlap each other in plan view as effective electrodes across the entire surfaces of both end faces in the stacking direction of each measurement region.

For the measurement of the Ni concentration, a TEM-EDS (TEM JEM-2100F manufactured by JEOL Ltd.) and an EDS detector (JED-2300T manufactured by JEOL Ltd.) were used. Samples for measurement were made by mechanically polishing (polishing in a plane normal to the internal electrode layer) a reoxidized multilayer ceramic capacitor and thinning the polished multilayer ceramic capacitor by ion milling. A sample with a thickness of 0.05 μm was made for each of five measurement regions. Each measurement region was scanned and measured with a probe diameter of 1.5 nm, and the Ni concentration in each measurement region was measured. To measure the Ni concentration, the Ni concentration was calculated from an STEM-EDS spectrum using the JED Series Analysis Program manufactured by JEOL Ltd. as described above. When the Ni concentration in each of the five measurement regions was within ±20% of the average of the Ni concentrations in the measurement regions, the Ni concentration of the dielectric layer 11 in the multilayer ceramic capacitor 100 was considered to be uniform. In the multilayer ceramic capacitor 100, when the Ni concentrations of at least four dielectric layers 11 out of five different dielectric layers 11 were uniform, the Ni concentration of the overall dielectric layer in the stacking direction of the multilayer ceramic capacitor 100 was considered to be uniform.

Analysis

FIG. 6 presents the thickness of the internal electrode layer 12, the thickness of the dielectric layer 11, the ratio of the thickness of the internal electrode layer 12 to the thickness of the dielectric layer 11, and whether the Ni concentration is uniform or non-uniform. As presented in FIG. 6, in the examples 1 to 12, the Ni concentration of the overall dielectric layer 11 in the stacking direction of the multilayer ceramic capacitor 100 was uniform. This is considered because Ni was sufficiently diffused into the dielectric layer 11 by making the thickness of the internal electrode layer 12 be 0.2 µm or greater. In the examples 2 and 5, the Ni concentration in the stacking direction was non-uniform in one of five arbitrary dielectric layers 11, while in the remaining examples, the Ni concentration in the stacking direction was uniform in all five arbitrary dielectric layer 11. This is considered because the ratio of the thickness of the internal electrode layer 12 to the thickness of the dielectric layer 11 was 0.5 or greater, and thereby Ni was sufficiently diffused into the dielectric layer 11. In contrast, in the comparative examples 1 and 2, the Ni concentration of the dielectric layer in the stacking direction of the multilayer ceramic capacitor 100 did not become uniform. This is considered because the thickness of the internal electrode layer 12 was less than 0.2 µm and thereby Ni was not sufficiently diffused into the dielectric layer 11.

The ratio of the thickness of the internal electrode layer 12 to the thickness of the dielectric layer 11 is preferably 2.0 or less, more preferably 1.5 or less. When the ratio of the thickness of the internal electrode layer 12 to the thickness of the dielectric layer 11 is made to be within the above described range, the number of the internal electrode layers 12 and the number of the dielectric layers 11 can be increased. Therefore, the capacitance of the multilayer ceramic capacitor 100 can be increased.

In FIG. 6, the number in the column of "number of uniform locations" presents the number of locations in which the Ni concentration was judged to be uniform in five different locations at which the dielectric layer was measured. The column of "most deviated region" represents the location of the measurement region of which the Ni concentration deviated from the average the most among measurement regions in accordance with FIG. 3. In the examples 2 and 5, the region where the Ni concentration was uniform is presented. The column of "percentage of deviation from average" presents the percentage of the deviation when the Ni concentration deviated from the average the most in the measured Ni concentrations. In the examples 1 to 12, presented is the percentage of the deviation when the Ni concentration deviated from the average the most among the dielectric layers of which the Ni concentrations were uniform.

The variability in capacitance were examined. Capacitances of 10000 samples were measured for each of the examples 1 to 12 and the comparative examples 1 and 2, and the number of samples of which the capacitance differs from the average by ±20% or more was examined. The result is presented in FIG. 6. The number of capacitance anomalies presented in FIG. 6 is the number of samples of which the capacitance differed from the average by ±20% or more in 10000 samples. The circle represents that the number of capacitance anomalies is zero, and the cross mark represents that the number of capacitance anomalies is one or more. In any of the examples 1 to 12, the number of capacitance anomalies was zero. This is considered because since the Ni concentrations in the stacking direction in the five measurement regions of the dielectric layer 11 became uniform by making the thickness of the internal electrode layer 12 be 0.2 µm or greater, the decrease in permittivity is reduced, and the capacitance of the multilayer ceramic capacitor 100 therefore stabilized. In contrast, in the comparative examples 1 and 2, the number of capacitance anomalies increased. This is considered because since the thickness of the internal electrode layer 12 was less than 0.2 µm, the Ni concentration of the dielectric layer 11 in the stacking direction did not become uniform, the decrease in permittivity could not be inhibited, and therefore, the capacitance of the multilayer ceramic capacitor did not stabilize.

In the examples 1 to 12, the Ni concentration in a crystal grain and the Ni concentration of the crystal grain boundary adjacent to the crystal grain were measured with the previously described method. The Ni concentration in a crystal grain was within ±20% of the Ni concentration of the crystal grain boundary adjacent to the crystal grain and thus was equal to the Ni concentration of the crystal grain boundary in all the examples. As described above, in the examples 1 to 12, Ni does not disproportionately exist in the crystal grain boundary, and therefore, it can be said that the capacitance is stable.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a pair of external electrodes;
   a first internal electrode that contains a base metal and is coupled to one of the pair of external electrodes;
   a dielectric layer that is stacked on the first internal electrode and contains a ceramic material and the base metal, wherein a main component of the dielectric layer is the ceramic material; and
   a second internal electrode that is stacked on the dielectric layer, contains the base metal, and is coupled to another one of the pair of external electrodes, wherein
   a concentration of the base metal in each of five regions is within ±20% of an average of the concentrations of the base metal in the five regions, each of the five regions including the base material, the five regions being obtained by dividing a region of the dielectric layer equally into five in a stacking direction, the region of the dielectric layer being located from a location 50 nm away from the first internal electrode to a location 50 nm away from the second internal electrode in the stacking direction between the first internal electrode and the second internal electrode, wherein abundance of Ba and Ti in each of the five regions is more than 90% as measured by measuring abundance of Ba atoms and Ti atoms by a transmission electron microscope, a thickness of the first internal electrode and a thickness of the second internal electrode are 0.2 μm or greater, and the region located from the location 50 nm away from the first internal electrode to the location 50 nm away from the second internal electrode includes both a crystal grain of the ceramic material and a crystal grain boundary of the crystal grain.

2. The multilayer ceramic capacitor according to claim 1, wherein
the concentration of the base metal in each of the five regions is within ±10% of the average of the concentrations of the base metal in the five regions.

3. The multilayer ceramic capacitor according to claim 1, wherein
the concentration of the base metal in each of the five regions is within ±5% of the average of the concentrations of the base metal in the five regions.

4. The multilayer ceramic capacitor according to claim 1, wherein
a ratio of the thickness of the first internal electrode to a thickness of the dielectric layer and a ratio of the thickness of the second internal electrode to the thickness of the dielectric layer are 0.5 or greater.

5. The multilayer ceramic capacitor according to claim 1, wherein
the ceramic material is $BaTiO_3$, and
the base metal is Ni.

6. The multilayer ceramic capacitor according to claim 1, wherein
a plurality of dielectric layers are stacked across an internal electrode, and
80% or more of the plurality of dielectric layers are the dielectric layer, and two internal electrodes sandwiching the dielectric layer are the first internal electrode and the second internal electrode.

7. The multilayer ceramic capacitor according to claim 1, wherein the concentration of the base metal is measured by TEM (Transmission Electron Microscope).

8. The multilayer ceramic capacitor according to claim 1, wherein the concentration of the base metal in the crystal grain is within ±20% of the concentration of the base metal in the crystal grain boundary.

* * * * *